United States Patent
Chen et al.

(10) Patent No.: US 10,789,116 B2
(45) Date of Patent: Sep. 29, 2020

(54) METHOD FOR DETERMINING LOCATION WHERE MEMORY ERROR OCCURS

(71) Applicants: Inventec (Pudong) Technology Corporation, Shanghai (CN); INVENTEC CORPORATION, Taipei (TW)

(72) Inventors: Jin Chen, Shanghai (CN); Kai Bao, Shanghai (CN)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 180 days.

(21) Appl. No.: 16/220,108

(22) Filed: Dec. 14, 2018

(65) Prior Publication Data

US 2020/0151046 A1    May 14, 2020

(30) Foreign Application Priority Data

Nov. 9, 2018  (CN) .......................... 2018 1 1331706

(51) Int. Cl.
    *G06F 11/07*    (2006.01)

(52) U.S. Cl.
    CPC ...... *G06F 11/0772* (2013.01); *G06F 11/0721* (2013.01); *G06F 11/0727* (2013.01); *G06F 11/0775* (2013.01)

(58) Field of Classification Search
    CPC ............. G06F 11/0772; G06F 11/0721; G06F 11/0727; G06F 11/0775; G06F 11/073; G06F 11/0787; G06F 11/3031; G06F 11/3476

USPC ......................................................... 714/805
See application file for complete search history.

(56) References Cited

U.S. PATENT DOCUMENTS

| | | | |
|---|---|---|---|
| 8,832,528 B2* | 9/2014 | Thatcher ................. | G06F 3/064 714/766 |
| 2009/0287956 A1* | 11/2009 | Flynn ................... | G06F 11/1008 714/6.12 |
| 2017/0220404 A1* | 8/2017 | Polar Seminario .......................... | G06F 11/0736 |
| 2017/0262329 A1* | 9/2017 | Lehmann ............ | G06F 11/0778 |
| 2018/0060168 A1* | 3/2018 | Kelly ................... | G06F 11/1048 |

* cited by examiner

*Primary Examiner* — Albert Decady
*Assistant Examiner* — Enam Ahmed
(74) *Attorney, Agent, or Firm* — Locke Lord LLP; Tim Tingkang Xia Esq.

(57) ABSTRACT

A method for determining a location where a memory error occurs comprises acquiring a memory error correction log file which records the error, and extracting a memory address, a MISC register value and an error type corresponding to the error from the log file; when the amount of memory sticks is more than 1, calculating and obtaining a memory system address corresponding to the error according to the memory address, the MISC register value and the error type; calculating the CPU location corresponding to the error and the memory controller location in a local proxy according to the memory system address; calculating a channel location and a channel address corresponding to the error according to the memory system address, the CPU location and the memory controller location; and calculating a memory stick location corresponding to the error according to the channel location and the channel address.

10 Claims, 6 Drawing Sheets

METHOD FOR DETERMINING LOCATION WHERE MEMORY ERROR OCCURS

CROSS-REFERENCE TO RELATED APPLICATIONS

This non-provisional application claims priority under 35 U.S.C. § 119(a) on Patent Application No(s). 201811331706.0 filed in China on Nov. 9, 2018, the entire contents of which are hereby incorporated by reference.

BACKGROUND

1. Technical Field

This disclosure relates to a technical field of memory, and particularly to a method, system and electronic apparatus for determining the location where a memory error occurs.

2. Related Art

In the present day, for determining the specific location where a memory correctable error (CE) occurs, raw data recorded in a BMC sel log by the basic input output system (BIOS) should be a basis. However, the BIOS will send a log to the BMC sel log just if the memory correctable error reaches the preset threshold (default 500). As a result, when just one memory correctable error occurs, the specific memory stick location where this error occurs cannot be determined. Furthermore, for another memory error, memory Patrol Scrub UCE Downgrades to CE error, the BIOS does not record it into the BMC sel log, so that the specific memory stick location cannot be determined. On the client side, one or more memory errors occur frequently. If there is no record of said one or more memory errors, it is difficult to determine the specific memory stick locations where they occur.

SUMMARY

In an embodiment of this disclosure, a method for determining a location where a memory error occurs comprises: step S1: acquiring a memory error correction log file which records the memory error, and extracting a memory address, a value of a MISC register and an error type corresponding to the memory error from the memory error correction log file; step S2: determining the amount of memory sticks connected to a channel, wherein when the amount of the memory sticks is 1, step S3 is performed, and when the amount of the memory stick is more than 1, step S4 is performed; step S3: calculating and obtaining a CPU location, a block and a memory controller location corresponding to the memory error according to the memory error correction log file, determining the location where the memory error occurs, and terminating the mission; step S4: calculating and obtaining a memory system address corresponding to the memory error according to the memory address, the value of the MISC register and the error type; step S5: calculating and obtaining the CPU location corresponding to the memory error and the memory controller location in a local proxy according to the memory system address; step S6: calculating and obtaining a channel location and a channel address corresponding to the memory error according to the memory system address corresponding to the memory error, the CPU location corresponding to the memory error and the memory controller location in the local proxy; S7: calculating and obtaining a memory stick location corresponding to the memory error according to the channel location and the channel address corresponding to the memory error.

In an embodiment of this disclosure, the step of calculating the central processing unit location and the memory controller location in the local proxy according to the memory system address comprises: step S51: executing a memory error position script, and searching for a node firstly connected with one of the memory sticks; step S52: searching for a matching limited address from a dynamic random access memory rule register in a source address decoder in a local proxy, and determining whether the limited address is larger than the address of a first temporary file, wherein if yes, step S53 is performed, but if no, step S55 is performed; step S53: decoding a memory system address corresponding to the memory error by the source address decoder, which comprises: determining a type of an interleaved mode supported by a current system structure, defining a system address according to the interleaved mode, calculating an interleaved list index, and reading out the node location of the corresponding local proxy from the cache proxy interleaved list register corresponding to the interleaved list index.; step S54: calculating and obtaining the CPU location and the memory controller location in the local proxy according to the determined local proxy node location, and then performing step S6; step S55: terminating the mission.

In an embodiment of this disclosure, the step of calculating and obtaining the channel location and the channel address corresponding to the memory error according to the memory system address corresponding to the memory error, the CPU location corresponding to the memory error and the memory controller location in the local proxy comprises: step S61: according to the CPU location and the acquired memory controller location as described above, reading out the value of a target address decoder path register of the CPU from the corresponding memory controller, and determining whether the limited address in the target address decoder path is larger than the address of the second temporary file, where if yes, step 62 is performed, but if no, step 67 is performed; step S62: reading out a local system additional register byte corresponding to the local proxy, and calculating a shift value according to the local system additional register byte; step S63: reading out a channel path value in the target address decoder path register, and calculating and obtaining a channel interleaved value according to the channel path value; step S64: determining the channel location corresponding to the memory error according to the channel interleaved value; step S65: reading out an offset value in a target address decoder channel offset register, and calculating a CPU path value according to the CPU interleaved path value; step S66: calculating and obtaining the channel address according to the memory system address, the CPU path value, the channel path value and the offset value, and performing step S7; step S67: terminating the mission.

In an embodiment of this disclosure, the step of calculating and obtaining the memory stick location corresponding to the memory error according to the channel location and the channel address corresponding to the memory error comprises: step S71: reading out the value of a memory group interleaved range path limited register, and determining whether the limited address in the memory group interleaved range path limited register is larger than the address of the third temporary file, wherein if yes, step S72 is performed, but if no, step S73 is performed; step S72: reading out a target memory group interleaved location value in a memory group interleaved range offset register, and calculating the memory stick location corresponding to the memory error according to the target memory group interleaved location value; step S73: terminating the mission.

In an embodiment of this disclosure, a system for determining a location where a memory error occurs comprises a input module configured to acquire a memory error correction log file which records the memory error, and a processing module configured to extract a memory address, a value of a miscellaneous register and an error type corresponding to the memory error from the memory error correction log file, to determine an amount of memory sticks connected to a channel, wherein when the amount of the memory sticks is 1, the processing module is configured to calculate and obtain a CPU location, a block and a memory controller location corresponding to the memory error according to the memory error correction log file, to determine the location where the memory error occurs and to terminate, wherein when the amount of the memory sticks is more than 1, the processing module is configured to calculate and obtain a memory system address corresponding to the memory error according to the memory address, the miscellaneous register value and the error type, wherein the processing module is configured to calculate and obtain the CPU location corresponding to the memory error and the memory controller location in a local proxy according to the memory system address, to calculate and obtain a channel location and a channel address corresponding to the memory error according to the memory system address corresponding to the memory error, the CPU location corresponding to the memory error and the memory controller location in the local proxy, and to calculate and obtain a memory stick location corresponding to the memory error according to the channel location and the channel address corresponding to the memory error.

In an embodiment of this disclosure, the implementation that the processing module calculates the CPU location and the memory controller location in the local proxy according to the memory system address comprises: executing a memory error position script, and searching for a node firstly connected with one of the memory sticks in order; searching for a matching limited address from a dynamic random access memory rule register in a source address decoder in a cache proxy, and determining whether the limited address is larger than an address of a first temporary file; when a result of determining whether the limited address is larger than the address of the first temporary file is negative, terminating the mission; when the result of determining whether the limited address is larger than the address of the first temporary file is positive, decoding a memory system address corresponding to the memory error by the source address decoder, which comprises: determining a type of an interleaved mode supported by a current system structure, defining a system address according to the interleaved mode, calculating an interleaved list index, and reading out a local proxy node location from a cache proxy interleaved list register corresponding to the interleaved list index; and calculating and obtaining the CPU location and the memory controller location in the local proxy according to the local proxy node location.

In an embodiment of this disclosure, the implementation that the processing module calculates and obtains the channel location and the channel address corresponding to the memory error according to the memory system address corresponding to the memory error, the CPU location corresponding to the memory error and the memory controller location in the local proxy comprises: reading out a value of a target address decoder path register of the CPU according to the CPU location and the memory controller location in the local proxy, and determining whether a limited address in the target address decoder path is larger than an address of a second temporary file; when a result of determining whether the limited address in the target address decoder path is larger than the address of the second temporary file is negative, terminating; when the result of determining whether the limited address in the target address decoder path is larger than the address of the second temporary file is positive, reading out a local system additional register byte corresponding to the local proxy, and calculating a shift value according to the local system additional register byte; reading out a channel path value in the target address decoder path register and a CPU interleaved path value, and calculating and obtaining a channel interleaved value according to the channel path value; determining the channel location corresponding to the memory error according to the channel interleaved value; reading out an offset value in a target address decoder channel offset register, and calculating a CPU path value according to the CPU interleaved path value; and calculating and obtaining the channel address according to the memory system address, the CPU path value, the channel path value and the offset value.

In an embodiment of this disclosure, the implementation that the processing module calculates and obtains the memory stick location corresponding to the memory error according to the channel location and the channel address corresponding to the memory error comprises: reading out a value of a memory group interleaved range path limited register, and determining whether a limited address in the memory group interleaved range path limited register is larger than an address of a third temporary file; when a result of determining whether the limited address in the memory group interleaved range path limited register is larger than the address of the third temporary file is negative, terminating; and when the result of determining whether the limited address in the memory group interleaved range path limited register is larger than the address of the third temporary file is positive, reading out a target memory group interleaved location value in a memory group interleaved range offset register, and calculating the memory stick location corresponding to the memory error according to the target memory group interleaved location value.

In an embodiment of this disclosure, a storage medium stores a computer program, wherein the computer program is loaded and performed by a processor to implement the method for determining the location where the memory error occurs as described in any one of the above embodiments.

In an embodiment of this disclosure, an electronic apparatus comprises a processor and a storage device, wherein the storage device is configured to store a computer program, the processor is configured to load and perform the computer program, so as to allow the electronic apparatus to implement the method for determining the location where the memory error occurs as described in any one of the above embodiments.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
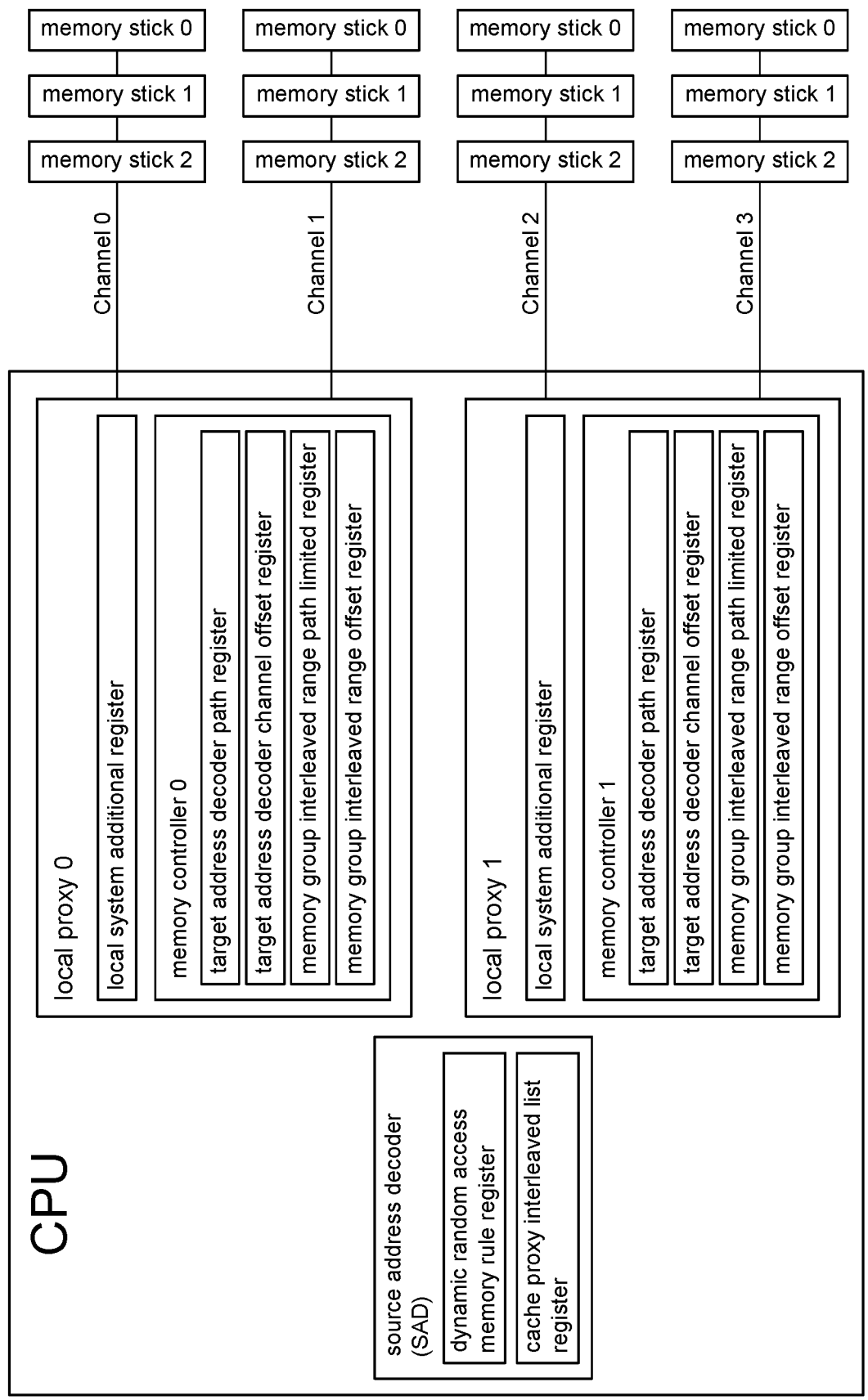
FIG. 1 illustrates a schematic diagram of an operating environment of detecting the location where a memory error occurs in an embodiment of this disclosure.

One or more embodiments of this disclosure provide a method for determining a location where a memory error occurs, in order to solve the problem that the location where the memory error occurs is difficult to be determined. As shown in FIG. 1, in this embodiment, each CPU has two memory controllers, respectively being memory controller 0 and memory controller 1. Each memory controller comprises two channels. For example, memory controller 0 comprises channel 0 and channel 1, and memory 1 comprises channel 2 and channel 3. Each channel is connected with memory stick 0, memory stick 1 and memory stick 2.

Figure 2:
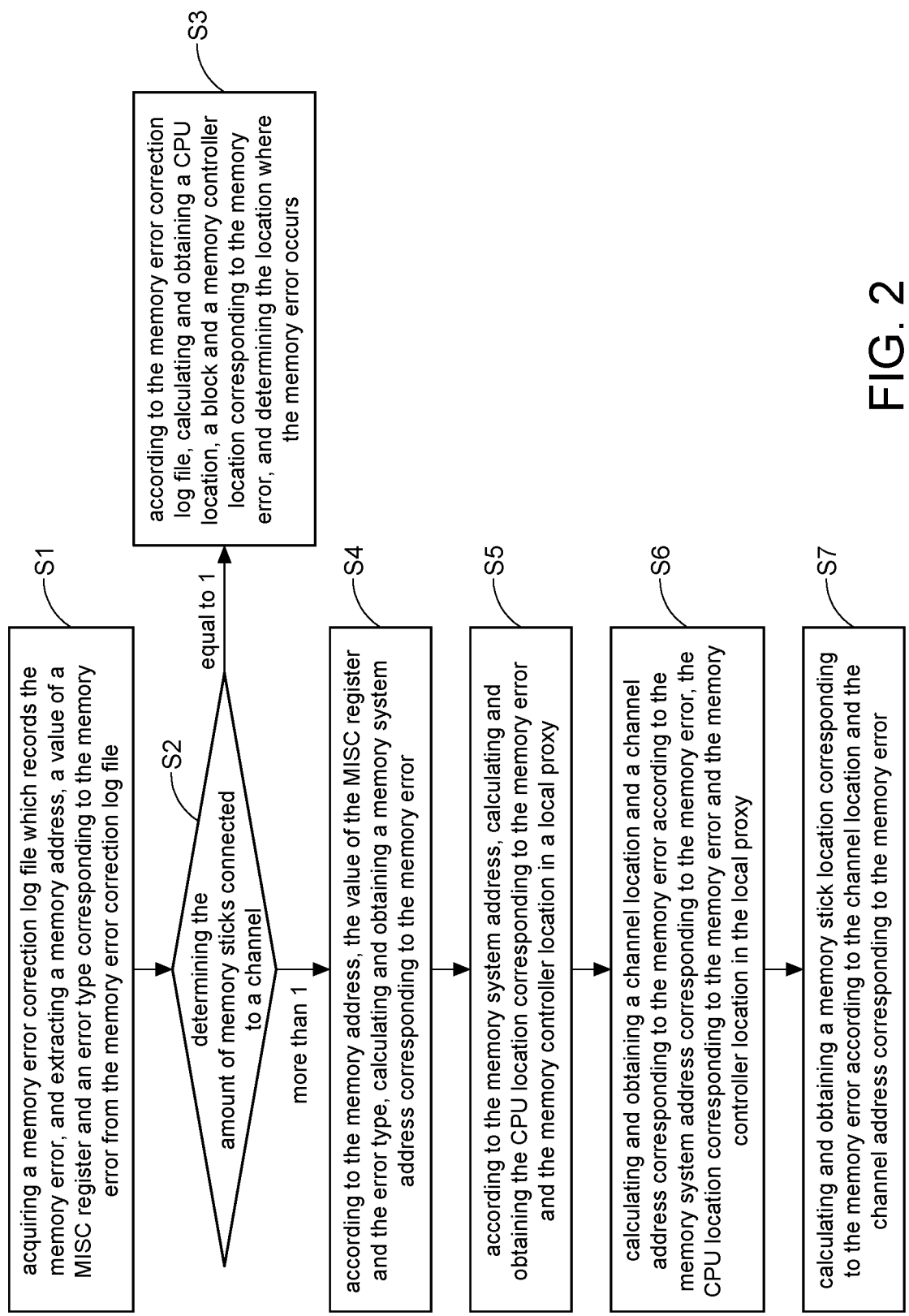
FIG. 2 illustrates a flowchart of detecting a location where a memory error occurs in an embodiment of this disclosure.

As shown in FIG. 2, the method for determining a location where the memory error occurs comprises the following steps S1-S7.

Step S1 is acquiring a memory error correction log file which records the memory error, and extracting a memory address, a value of a miscellaneous (MISC) register and an error type corresponding to the memory error from the memory error correction log file.

In general, the memory error correction log file, also known as machine check exception log (mce log), can record the information related to the memory error, including the memory address and the value of the MISC register. From the mce log surface information, only the location of the memory channel can be determined at most. Two memory sticks can be inserted into a general channel, so when one of the memory sticks of the channel reports an error, which memory stick has the error cannot be specifically determined.

The value of the MISC register, the memory address and the error type corresponding to the memory error can be obtained from the mce log. In this embodiment, a specific location of the memory with an error can be determined by utilizing the memory address and the value of the MISC register in the mce log and the calculation of steps S2-S7. Therefore, the test time cost by a production line may be effectively reduced, and the maintenance time on the customer line may be substantially shortened so as to greatly save maintenance costs.

Step S2 is determining the amount of memory sticks connected to a channel; when the amount of the memory sticks is 1, performing step S3; when the amount of the memory sticks is more than 1, performing step S4.

Step S3 is according to the memory error correction log file, calculating and obtaining a central processing unit (CPU) location, a block and a memory controller location corresponding to the memory error, determining the location where the memory error occurs, and terminating the mission of the method for determining the location where the memory error occurs.

Step S4 is according to the memory address, the value of the miscellaneous register and the error type, calculating and obtaining a memory system address corresponding to the memory error.

For example, the calculation formulas of a corrected error (CE) type memory error and an uncorrectable error (UCE) type memory error are respectively as follows.

CE: SysAddress=ADDR & 0x3fffffffc0
UCE: SysAddress=(ADDR & 0x3fffffffff) & (~((1<< (MISC & 0x3f))−1))

ADDR indicates the memory address, MISC indicates the value of the MISC register, and SysAddress indicates the memory system address.

Figure 3:
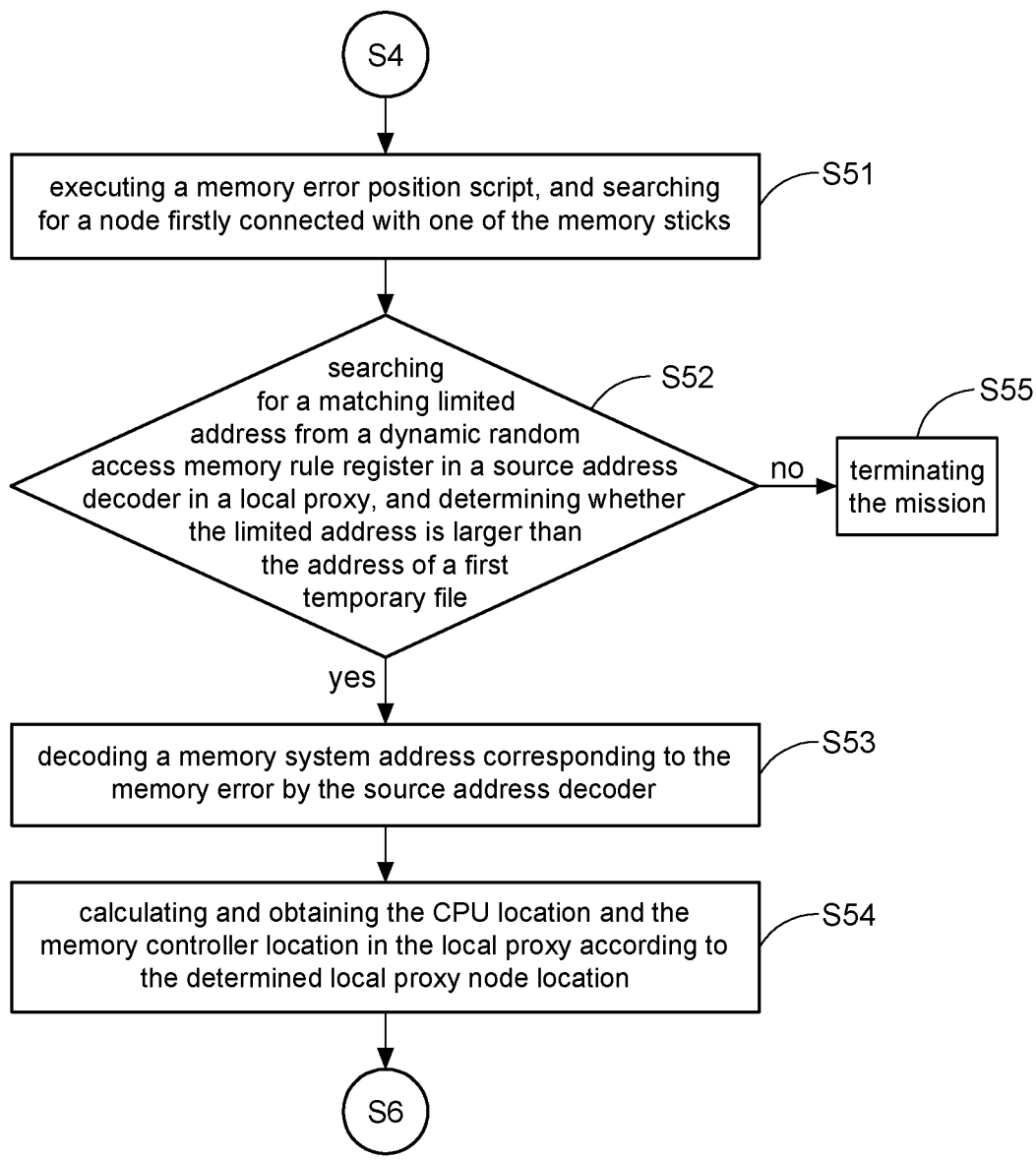
FIG. 3 illustrates a flowchart of calculating a CPU location and a memory controller location in a local proxy in an embodiment of this disclosure.

Step S5 is according to the memory system address, calculating and obtaining the CPU location corresponding to the memory error and the memory controller location in a local proxy. More specifically, as shown in FIG. 3, step S5 comprises the following steps S51-S55.

Step S51 is executing a memory error position script, and searching for a node firstly connected with one of the memory sticks.

Step S52 is searching for a matching limited address from a dynamic random access memory rule register in a source address decoder in a local proxy, and determining whether the limited address is larger than the address of a first temporary file; when yes (i.e. the determined result is positive), performing step S53; when no (i.e. the determined result is negative), performing step S55.

More specifically, there are four types of the source address decoder (SAD): dynamic random access memory (DRAM) decoder, memory-mapped I/O (MMIO) decoder, interleaved (memory interleaved) decoder and legacy decoder. The dynamic random access memory rule register in the source address decoder in the cache proxy supports DRAM decoders and MMIO decoders. This embodiment uses DRAM decoders. There are a total of 20 DRAM decoders that support different combinations of DARM configurations, and different interleaved modes correspond to interleaved list indexes of different cache proxy registers.

After finding the node firstly connected with the memory stick in order, the matching limited address found in the dynamic random access memory rule register in the source address decoder in the cache proxy is determined whether to be larger than the address of the first temporary file tempAddress. The address of the first temporary file is defined as a section of the byte of the aforementioned SysAddress (i.e. memory system address), such as SysAddress[bit a1:bit b1]. If the limited address is larger than tempAddress, it can be explained that this location matches the memory address, and then the next step is performed; on the contrary, the program is terminated (i.e. exiting from the program).

Step S53 is decoding a memory system address corresponding to the memory error by the source address decoder, which comprises: determining a type of an interleaved mode supported by a current system structure, defining a system address according to the interleaved mode, calculating an interleaved list index, and reading out the node location of the corresponding local proxy 0 or local proxy 1 from the cache proxy interleaved list register corresponding to the interleaved list index. For example, the specific calculation formulas are as follows.

mode1: interleaveListIndex=(SysAddress>>6) & 0 mode2: interleaveListIndex=(((SysAddress>>7) & 3)<<1)|((SysAddress>>9) & 1)

Interleave_Mode=0: interleaveListIndex Λ=((SysAddress>>16) & 7)

Step S54 is calculating and obtaining the CPU location and the memory controller location in the local proxy according to the determined local proxy node location (i.e. local proxy 0 or local proxy 1) as above, and then performing step S6.

The specific calculation formulas of step S54 include the following formulas.

SocketId=(haNodeId & 3)

MemoryControllerId=(haNodeId & BIT2)>>2

SocketId indicates the CPU location; Memory ControllerId indicates the memory controller location; and hallodeId indicates the local proxy node location. In this embodiment, when the located local proxy is local proxy 0 (i.e. local proxy 0 is determined as the local proxy location), memory controller 0 can be located; when the located local proxy is local proxy 1, memory controller 1 can be located.

Step S55 is terminating the mission of the method for determining the location where the memory error occurs.

Figure 4:
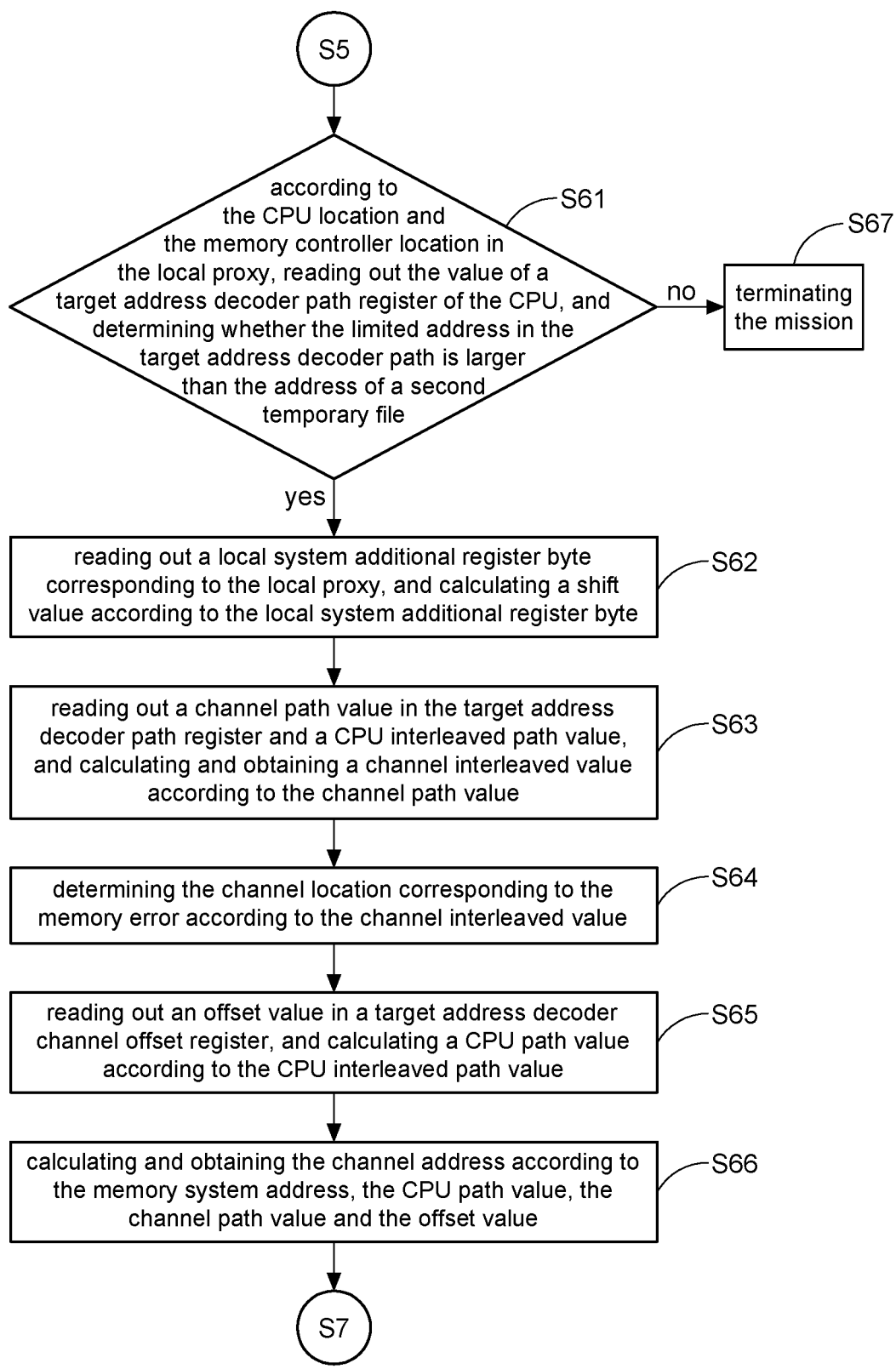
FIG. 4 illustrates a flowchart of calculating a channel location and a channel address in an embodiment of this disclosure.

Step S6 is calculating and obtaining a channel location and a channel address corresponding to the memory error according to the memory system address corresponding to the memory error, the CPU location corresponding to the memory error and the memory controller location in the local proxy. More specifically, as shown in FIG. 4, step S6 comprises the following steps S61-67.

Step S61 is according to the CPU location and the acquired memory controller location as described above, reading out the value of a target address decoder path register of the CPU from the corresponding memory controller 0 or memory controller 1, and determining whether the limited address in the target address decoder path is larger than the address of the second temporary file tempAddress. The address of the second temporary file is defined as a section of the byte of the aforementioned SysAddress, such as the address of SysAddress[bit a2:bit b2]. If the determined result is positive, this location is considered to match the memory address, and then the next step (i.e. step S62) is performed; when the determined result is negative, the program is terminated.

Step S62 is reading out a local system additional register byte corresponding to the local proxy, and calculating a shift value according to the local system additional register byte.

Step S63 is reading out a channel path value in the target address decoder path register, which is defined as tad_ch_way, and a CPU interleaved path value, which is defined as tad_skt_way, and calculating and obtaining a channel interleaved value chInterleave according to the channel path value.

The final channel interleaved value chInterleave=chInterleave % (tad_ch_way+1).

Step S64 is determining the channel location corresponding to the memory error according to the channel interleaved value. In other words, when the located memory controller is memory controller 0 in local proxy 0, the memory error corresponds to channel 0 or channel 1; when the located memory controller is memory controller 1 in local proxy 1, the memory error corresponds to channel 2 or channel 3.

Step S65 is reading out an offset value in a target address decoder channel offset register, which is defined as tad_offset, and calculating a CPU path value according to the CPU interleaved path value.

socket_wayness=1<<tad_skt_way, wherein socket_wayness indicates the central processing unit path value.

Step S66 is calculating and obtaining the channel address according to the memory system address, the CPU path value, the channel path value and the offset value, and performing step S7.

More specifically, according to the definition of the conversion from the system address into the channel address, the calculation formula is as follows.

Channel address Ch_address=[(sysddress)/(socket_wayness*tad_ch_way)]−tad_offset.

Step S67 is terminating the mission of the method for determining the location where the memory error occurs.

It should be noted that a target address decoder (TAD) calculates the channel interleaved value according to the analysis result from the SAD. Each TAD has a base address, an address limit and an address size. The address limit is stored in a TAD register (i.e. target address decoder path register); the base address is always defined as address 0; and the address limit is defined as: limit [n]=base [n]+size [n].

0<=physical address [45:26]<=TAD[0].Limt, when N=0;

TAD[N−1].limit+1<=physical address [45:26]<=TAD[N].Limt; when N=1 to 11.

The symbol of tad_skt_way is the used interleaved value of the memory of the corresponding CPU, and the symbol of tad_ch_way is the used interleaved value of the memory of the corresponding channel.

Figure 5:
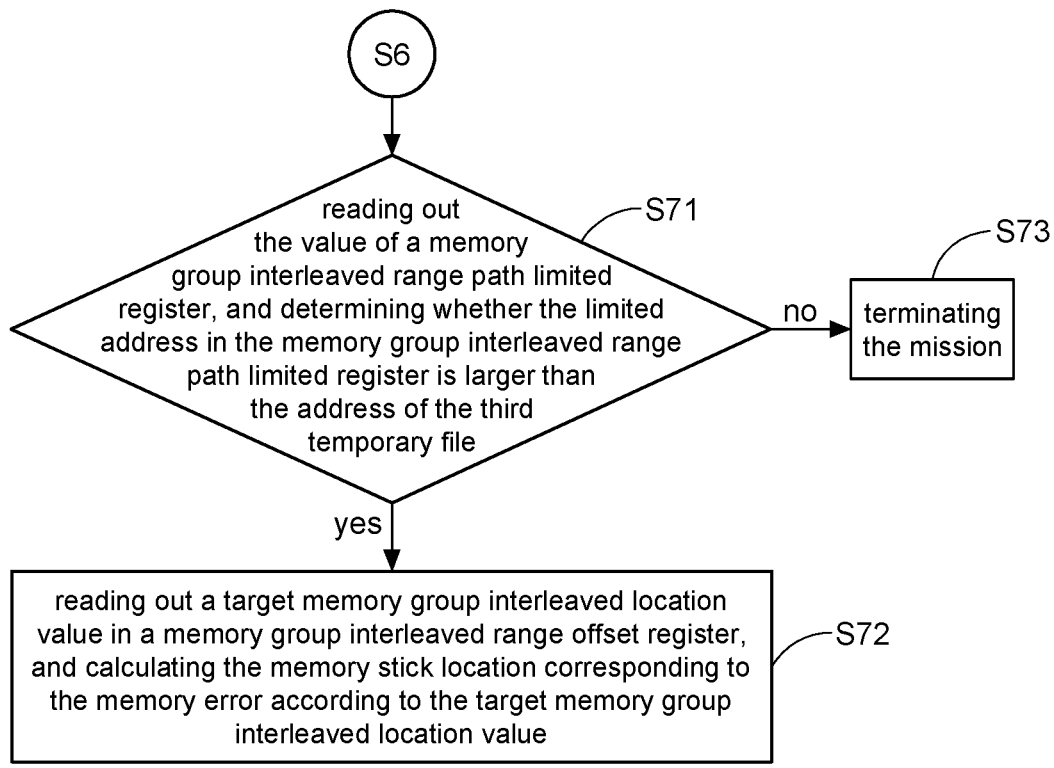
FIG. 5 illustrates a flowchart of calculating a memory stick location corresponding to a memory error in an embodiment of this disclosure.

Step S7 is calculating and obtaining a memory stick location corresponding to the memory error according to the channel location and the channel address corresponding to the memory error. More specifically, as shown in FIG. 5, step S7 comprises the following steps S71-S73.

Step S71 is reading out the value of a memory group interleaved range path limited register, and determining whether the limited address in the memory group interleaved range path limited register is larger than the address of the third temporary file tempAddress. The address of the third temporary file is defined as a section of the byte of the aforementioned Ch_address, such as Ch_address [bit c1:bit d1]; when the determined result is positive, the next step is performed; when the determined result is negative, the program is terminated.

Step S72 is reading out a target memory group interleaved location value in a memory group interleaved range offset register, which is defined as rir_rnk_tgtN, and calculating the memory stick location Dimm Slot corresponding to the memory error according to the target memory group interleaved location value, wherein the formula is as follows Dimm Slot=rir_rnk_tgtN/4

In this embodiment, Dimm Slot can be determined as the memory stick connected to the corresponding channel, such as memory stick 0, memory stick 1 or memory stick 2 in FIG. 1.

Step S73 is terminating the mission of the method for determining the location where the memory error occurs.

It should be noted that all or part of the steps in each of the above method embodiments can be implemented by hardware associated with a computer program. Based on this understanding, this disclosure also provides a computer program product comprising one or more computer instructions. The computer instructions can be stored in a computer-readable storage medium. The computer-readable storage medium can be any usable medium where the computer can store data, or a data storage device such as a server, a data center, etc., which comprises one or more usable medium integrations. The usable medium can be a magnetic medium (e.g. soft disk, hard disk, tape), an optical medium (e.g. DVD) or a semiconductor medium (e.g. solid state disk, SSD), etc.

Figure 6:
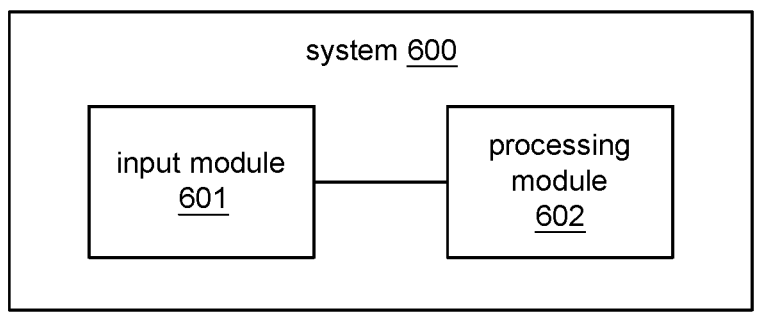
FIG. 6 illustrates a schematic diagram of a system for detecting a location where a memory error occurs in an embodiment of this disclosure.

Please refer to FIG. 6, this embodiment provides a system 600 for determining the location where a memory error occurs, serving as a style of software which is installed in an electronic apparatus, so as to implement the method for determining the location where the memory error occurs during operation as described in the above method embodiment. Since the technical principle of this system embodiment is similar to the technical principle of the aforementioned method embodiment, the same technical details are not repeatedly described.

The system 600 for determining the location where a memory error occurs specifically comprises an input module 601 and a processing module 602. The input module 601 is configured to perform step S1 as introduced in the aforementioned method embodiment, and the processing module 602 is configured to perform steps S2-S7 as introduced in the aforementioned method embodiment.

It should be understood by those skilled in the art that the division of modules in the embodiment of FIG. 6 is merely a division of logical functions, which may be integrated in whole or in part into one or more physical entities. These modules can all be implemented by software called by one or more processing components, or all be implemented by hardware, or be in the form that part of modules are implemented by software called by one or more processing components and the other part of modules are implemented by hardware. For example, the processing module 602 can be a separate processing component or be integrated in a certain chip. Moreover, it can also be stored in a storage device in a form of a code, and the function of the processing module 602 can be called and performed by a certain processing component. The implementation of other modules is similar to the above. The processing component herein can be an integrated circuit with a signal processing function. In the implementation process, each step of the aforementioned method or each of the aforementioned modules can be achieved by an integrated logic circuit of hardware in a processor component or an instruction in the form of software.

Figure 7:
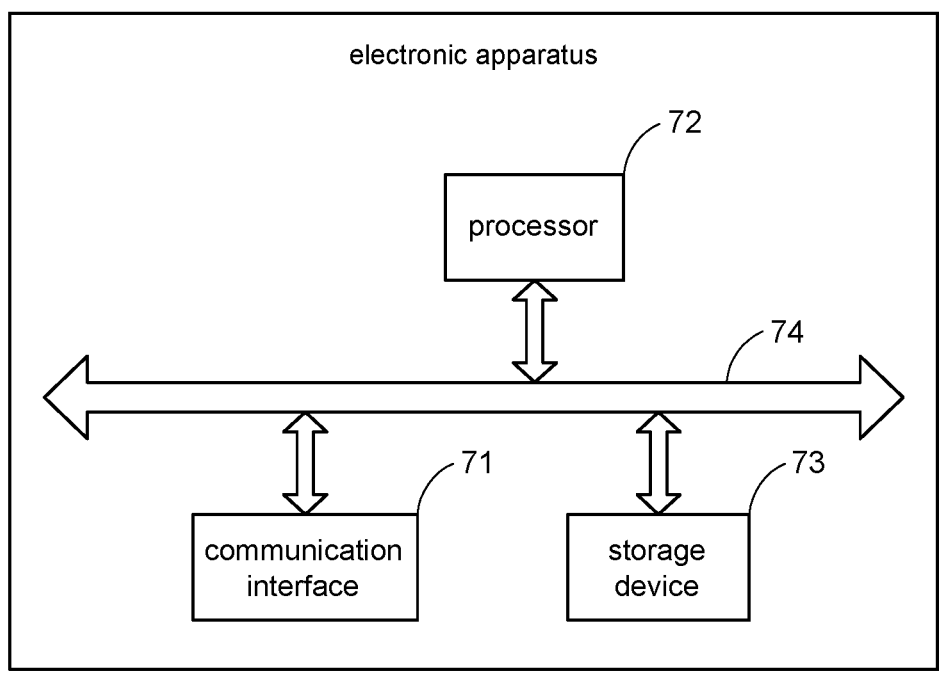
FIG. 7 illustrates a structure diagram of an electronic apparatus in an embodiment of this disclosure.

Please refer to FIG. 7, this embodiment provides an electronic apparatus. The electronic apparatus can be a desktop computer, a portable computer, a smart phone, etc. More particularly, the electronic apparatus comprises at least a communication interface 71, a processor 72 and a storage device 73 which are connected with one another via a bus 74, wherein the communication interface 71 is configured to receive data, the storage device 73 is configured to store a computer program, and the processor 72 is configured to perform the computer program stored in the storage device 73 so as to implement all or part of the steps in the aforementioned method embodiment.

The aforementioned system bus can be a peripheral component interconnect (PCI) bus, an extended industry standard architecture (EISA) bus and so on. The system bus can be classified as an address bus, a data bus, a control bus and so on. For ease of representation, merely one thick line is shown in the figure, but it does not intend to mean that there is merely one bus or one type of bus. The communication interface is configured to implement the communication between a database access device and other devices such as client terminal, read/write database and read-only database. The storage device can include a random access memory (RAM), and can also include a non-volatile memory, e.g. at least one magnetic disk memory.

The aforementioned processor can be a general-purpose processor, such as a central processing unit (CPU), a network processor (NP), etc.; moreover, it can also be a digital signal processing (DSP), an application specific integrated circuit (ASIC), a field-programmable gate array (FPGA) or other programmable logic device, discrete logic gate, transistor logic device, or discrete logic component.

In view of the above description, the method, system and electronic apparatus for determining a location where a memory error occurs of this disclosure may effectively overcome various disadvantages in the prior art and have high industrial utilization value.

What is claimed is:

1. A method for determining a location where a memory error occurs, comprising:
    acquiring a memory error correction log file which records the memory error, and extracting a memory address, a value of a miscellaneous register and an error type corresponding to the memory error from the memory error correction log file;
    determining an amount of memory sticks connected to a channel;
    when the amount of the memory sticks is 1, calculating and obtaining a central processing unit location, a block and a memory controller location corresponding to the memory error according to the memory error correction log file, determining the location where the memory error occurs, and terminating the method;
    when the amount of the memory sticks is more than 1, calculating and obtaining a memory system address corresponding to the memory error according to the memory address, the value of the miscellaneous register and the error type;
    calculating and obtaining the central processing unit location corresponding to the memory error and the memory controller location in a local proxy according to the memory system address;
    calculating and obtaining a channel location and a channel address corresponding to the memory error according to the memory system address corresponding to the memory error, the central processing unit location corresponding to the memory error and the memory controller location in the local proxy; and
    calculating and obtaining a memory stick location corresponding to the memory error according to the channel location and the channel address corresponding to the memory error.

2. The method according to claim 1, wherein calculating the central processing unit location and the memory controller location in the local proxy according to the memory system address comprises:
    executing a memory error position script, and searching for a node firstly connected with one of the memory sticks in order;
    searching for a matching limited address from a dynamic random access memory rule register in a source address decoder in a cache proxy, and determining whether the limited address is larger than an address of a first temporary file;

when a result of determining whether the limited address is larger than the address of the first temporary file is positive, decoding a memory system address corresponding to the memory error by the source address decoder, which comprises:

determining a type of an interleaved mode supported by a current system structure, defining a system address according to the interleaved mode, calculating an interleaved list index, and reading out a local proxy node location from a cache proxy interleaved list register corresponding to the interleaved list index; and when the result of determining whether the limited address is larger than the address of the first temporary file is negative, terminating the method;

calculating and obtaining the central processing unit location and the memory controller location in the local proxy according to the local proxy node location.

3. The method according to claim 2, wherein calculating and obtaining the channel location and the channel address corresponding to the memory error according to the memory system address corresponding to the memory error, the central processing unit location corresponding to the memory error and the memory controller location in the local proxy comprises:

reading out a value of a target address decoder path register of the central processing unit according to the central processing unit location and the memory controller location in the local proxy, and determining whether a limited address in the target address decoder path is larger than an address of a second temporary file;

when a result of determining whether the limited address in the target address decoder path is larger than the address of the second temporary file is positive, reading out a local system additional register byte corresponding to the local proxy, and calculating a shift value according to the local system additional register byte;

when the result of determining whether the limited address in the target address decoder path is larger than the address of the second temporary file is negative, terminating the method;

reading out a channel path value in the target address decoder path register and a central processing unit interleaved path value, and calculating and obtaining a channel interleaved value according to the channel path value;

determining the channel location corresponding to the memory error according to the channel interleaved value;

reading out an offset value in a target address decoder channel offset register, and calculating a central processing unit path value according to the central processing unit interleaved path value; and calculating and obtaining the channel address according to the memory system address, the central processing unit path value, the channel path value and the offset value.

4. The method according to claim 3, wherein calculating and obtaining the memory stick location corresponding to the memory error according to the channel location and the channel address corresponding to the memory error comprises:

reading out a value of a memory group interleaved range path limited register, and determining whether a limited address in the memory group interleaved range path limited register is larger than an address of a third temporary file;

when a result of determining whether the limited address in the memory group interleaved range path limited register is larger than the address of the third temporary file is positive, reading out a target memory group interleaved location value in a memory group interleaved range offset register, and calculating the memory stick location corresponding to the memory error according to the target memory group interleaved location value; and when the result of determining whether the limited address in the memory group interleaved range path limited register is larger than the address of the third temporary file is negative, terminating the method.

5. A system for determining a location where a memory error occurs, comprising:

an input module configured to acquire a memory error correction log file which records the memory error;

a processing module configured to extract a memory address, a value of a miscellaneous register and an error type corresponding to the memory error from the memory error correction log file, to determine an amount of memory sticks connected to a channel, wherein when the amount of the memory sticks is 1, the processing module is configured to calculate and obtain a central processing unit location, a block and a memory controller location corresponding to the memory error according to the memory error correction log file, to determine the location where the memory error occurs and to terminate, wherein when the amount of the memory sticks is more than 1, the processing module is configured to calculate and obtain a memory system address corresponding to the memory error according to the memory address, the miscellaneous register value and the error type, wherein the processing module is configured to calculate and obtain the central processing unit location corresponding to the memory error and the memory controller location in a local proxy according to the memory system address, to calculate and obtain a channel location and a channel address corresponding to the memory error according to the memory system address corresponding to the memory error, the central processing unit location corresponding to the memory error and the memory controller location in the local proxy, and to calculate and obtain a memory stick location corresponding to the memory error according to the channel location and the channel address corresponding to the memory error.

6. The system according to claim 5, wherein an implementation that the processing module calculates the central processing unit location and the memory controller location in the local proxy according to the memory system address comprises:

executing a memory error position script, and searching for a node firstly connected with one of the memory sticks in order;

searching for a matching limited address from a dynamic random access memory rule register in a source address decoder in a cache proxy, and determining whether the limited address is larger than an address of a first temporary file;

when a result of determining whether the limited address is larger than the address of the first temporary file is negative, terminating;

when the result of determining whether the limited address is larger than the address of the first temporary file is positive, decoding a memory system address corresponding to the memory error by the source address decoder, which comprises:

determining a type of an interleaved mode supported by a current system structure, defining a system address according to the interleaved mode, calculating an interleaved list index, and reading out a local proxy node location from a cache proxy interleaved list register corresponding to the interleaved list index; and calculating and obtaining the central processing unit location and the memory controller location in the local proxy according to the local proxy node location.

7. The system according to claim 6, wherein an implementation that the processing module calculates and obtains the channel location and the channel address corresponding to the memory error according to the memory system address corresponding to the memory error, the central processing unit location corresponding to the memory error and the memory controller location in the local proxy comprises:

reading out a value of a target address decoder path register of the central processing unit according to the central processing unit location and the memory controller location in the local proxy, and determining whether a limited address in the target address decoder path is larger than an address of a second temporary file;

when a result of determining whether the limited address in the target address decoder path is larger than the address of the second temporary file is negative, terminating;

when the result of determining whether the limited address in the target address decoder path is larger than the address of the second temporary file is positive, reading out a local system additional register byte corresponding to the local proxy, and calculating a shift value according to the local system additional register byte;

reading out a channel path value in the target address decoder path register and a central processing unit interleaved path value, and calculating and obtaining a channel interleaved value according to the channel path value;

determining the channel location corresponding to the memory error according to the channel interleaved value;

reading out an offset value in a target address decoder channel offset register, and calculating a central processing unit path value according to the central processing unit interleaved path value; and calculating and obtaining the channel address according to the memory system address, the central processing unit path value, the channel path value and the offset value.

8. The system according to claim 7, wherein an implementation that the processing module calculates and obtains the memory stick location corresponding to the memory error according to the channel location and the channel address corresponding to the memory error comprises:

reading out a value of a memory group interleaved range path limited register, and determining whether a limited address in the memory group interleaved range path limited register is larger than an address of a third temporary file;

when a result of determining whether the limited address in the memory group interleaved range path limited register is larger than the address of the third temporary file is negative, terminating; and when the result of determining whether the limited address in the memory group interleaved range path limited register is larger than the address of the third temporary file is positive, reading out a target memory group interleaved location value in a memory group interleaved range offset register, and calculating the memory stick location corresponding to the memory error according to the target memory group interleaved location value.

9. A non-transitory storage medium, storing a computer program, wherein the computer program is loaded and performed by a processor to implement the method for determining the location where the memory error occurs according to claim 1.

10. An electronic apparatus, comprising a processor and a non-transitory storage device, wherein the non-transitory storage device is configured to store a computer program, the processor is configured to load and perform the computer program, so as to allow the electronic apparatus to implement the method for determining the location where the memory error occurs according to claim 1.

* * * * *